United States Patent [19]

Kober

[11] 4,061,298

[45] Dec. 6, 1977

[54] CENTRALLY ANCHORED ALIGNING DEVICE FOR MACHINES

[75] Inventor: Hubert Reinhard Kober, Leverkusen, Germany

[73] Assignee: Fixatorenbau Bertuch & Co. GmbH, Leverkusen, Germany

[21] Appl. No.: 758,644

[22] Filed: Jan. 12, 1977

[30] Foreign Application Priority Data

Jan. 14, 1976  Germany .............................. 2601168

[51] Int. Cl.² .............................................. F16M 5/00
[52] U.S. Cl. ................................... 248/23; 248/188.4; 248/25; 403/43
[58] Field of Search ................. 248/24, 25, 23, 2, 500, 248/510, 188.2, 188.4, 180; 403/43, 44, 343; 52/701, 707

[56] References Cited

U.S. PATENT DOCUMENTS

| 2,624,537 | 1/1953 | Rovy ...................................... 248/180 |
| 2,779,559 | 1/1957 | Bertuch .................................. 248/24 |
| 2,813,733 | 11/1967 | Herrmann ............................... 403/44 |
| 3,356,324 | 12/1967 | Attermeyer ............................ 248/25 |
| 3,971,537 | 7/1976 | Winkle et al. ......................... 248/23 |

FOREIGN PATENT DOCUMENTS

| 602,735 | 12/1925 | France .................................... 403/343 |
| 1,063,426 | 8/1959 | Germany ............................... 248/24 |
| 419,738 | 3/1967 | Switzerland ........................... 248/24 |
| 1,085,314 | 9/1967 | United Kingdom .................... 248/23 |

Primary Examiner—Marion Parsons, Jr.
Attorney, Agent, or Firm—William R. Laney

[57] ABSTRACT

An improved aligning device for machines, in which a support body supporting a machine pedestal is guided in a threaded portion of a base body anchored to or in the ground, and is penetrated centrally by a tension rod, the support body and the tension rod being interconnected through an entrainment device, and the support body being arranged to be vertically adjusted also with the machine placed thereon.

23 Claims, 3 Drawing Figures

CENTRALLY ANCHORED ALIGNING DEVICE FOR MACHINES

BACKGROUND OF THE INVENTION

1. Field of the Invention

This invention relates to improvements in aligning devices for machines, and more particularly, but not by way of limitation, to an aligning device for machines, in which a support body supporting a machine pedestal is guided in a threaded portion of a base body anchored to or in the ground, and is penetrated centrally by a tension rod, the support body and the tension rod being interconnected through an entrainment device, and the support body being arranged to be vertically adjusted also with the machine placed thereon.

2. Description of the Prior Art

Aligning devices of this general type are known from West German Pat. No. 1,063,426. Therewith vertical adjustment is achieved by rotation of the tension rod, after the locking member has been disengaged, the support body being taken along and thereby also the machine pedestal and no disengagement of the machine pedestal from the support body being required. The support body is taken along by hexagonal profiles in the support body and on the tension rod.

The aligning devices of the type mentioned hereinbefore suffer from a substantial disadvantage in that the support body guided in a thread of the base body changes its vertical adjustment with rotation of the tension rod. Thereby also the length of the portion of the tension rod projecting over the upper edge of the support body is varied. Therefore even if originally a plurality of such alignment devices have been aligned to equal heights, different heights of the tension rods may result after realignment, and such different heights may be the cause of accidents under adverse circumstances. On the other hand, the different constructions of machine pedestals often permits only certain projecting tension rod lengths, which results in the necessity of storing tension rods of different lengths. It would therefore be desirable to have an alignment device available, which is adaptable to the requirements.

SUMMARY OF THE INVENTION

Consequently it is the object of the invention to provide an alignment device of the type mentioned hereinbefore in which the length of the tension rod projecting over the support body is independent of the adjustment of the support body.

In accordance with the invention this object is achieved in that the tension rod has a threaded portion below the entrainment device, said threaded portion being guided in a threaded sleeve mounted in the base body and arranged coaxial with respect to the tension rod, and that the thread on the tension rod has the same pitch as the thread on the support body. The threaded portion on the tension rod may have external threads and the threaded sleeve may have internal threads. The threaded sleeve may be mounted in a centering plate, which is placed in a recess in the bottom of the base body. The threaded sleeve may, however, also be integral with the centering plate.

Such construction of the aligning device insures that always only an invariable length of the tension rod projects over the support body, as also the tension rod is guided in a thread, whereby its axial position is changed when it is rotated. As the thread has the same pitch as the thread guiding the support body, the tension rod and the support body do not change their relative position when the tension rod is rotated. The centering plate in the bottom of the base body insures the coaxial alignment between tension rod and threaded sleeve indispensable with this type of tension rod guiding, and permits non-rotatable mounting of the threaded sleeve relative to the base body. Guiding of the tension rod in an internal thread offers additional protection against contamination.

In accordance with an advantageous modification of the invention, a threaded sleeve extending through the centering plate is secured to an anchoring screw. To this end the threaded sleeve may be screwed on the upper end of the anchoring screw and may be undetachably connected therewith by welding; however, it may also be integral with the anchoring screw. By this connection of the threaded sleeve with the anchoring screw, central anchoring of the base body becomes possible, which insures permanent flush engagement between machine pedestal, alignment device and foundation. This engagement indispensable for satisfactory operation of the aligning device was not always insured with off-center anchoring of the base body, because, in particular when the anchoring screws were inserted into floor not yet hardened through, distortions of the base body relative to the anchoring occur. The connection of the tension rod to a central anchoring screw, selected here, eliminates this disadvantage without impairing the adjustability of the tension rod, though the elements essential for the operation of the aligning device are secured to the anchoring screw.

The threaded sleeve may extend through a central bore of the centering plate and may engage the centering plate with an abutment, preferably in the form of a shoulder at the periphery.

The upper end of the threaded sleeve may be tapered or reduced in diameter and have a length which is at least equal to the sum of the adjustment displacement and the supporting thread length of the threaded sleeve. If necessary, the support body may have a counterbore at the bottom thereof and extending beyond the upper end of the threaded sleeve.

In this way a particularly simple and safe centering between tension rod, threaded sleeve and anchoring screw is achieved with which, at the same time, the threaded sleeve is prevented from extending too far into the interior of the base body. Furthermore, the uppermost end of the threaded sleeve is prevented from blocking the displacement of the support body with extreme adjustments.

In accordance with a preferable modification of the invention the entrainment device formed above the threaded portion of the tension rod comprises interengaging splined profiles on the tension rod and the internal bore of the support body. The splined profile on the tension rod may have a larger axial length. The entrainment device located above the guiding thread offers the advantage that the axial displacement of the tension rod relative to the support body can now be effected in both directions by the same amount so that altogether an increased adjustment displacement is available. The splined profile permits better finer adjustment than the prior art polygonal profiles; the greater axial length permits further adaptation to the respective different local situations without otherwise disadvantageous losses of adjustment displacement.

Embodiments of the invention are illustrated in the drawings and will be explained and described in detail hereinbelow with reference to the reference numerals.

DESCRIPTION OF THE PREFERRED EMBODIMENTS

Figure 1:
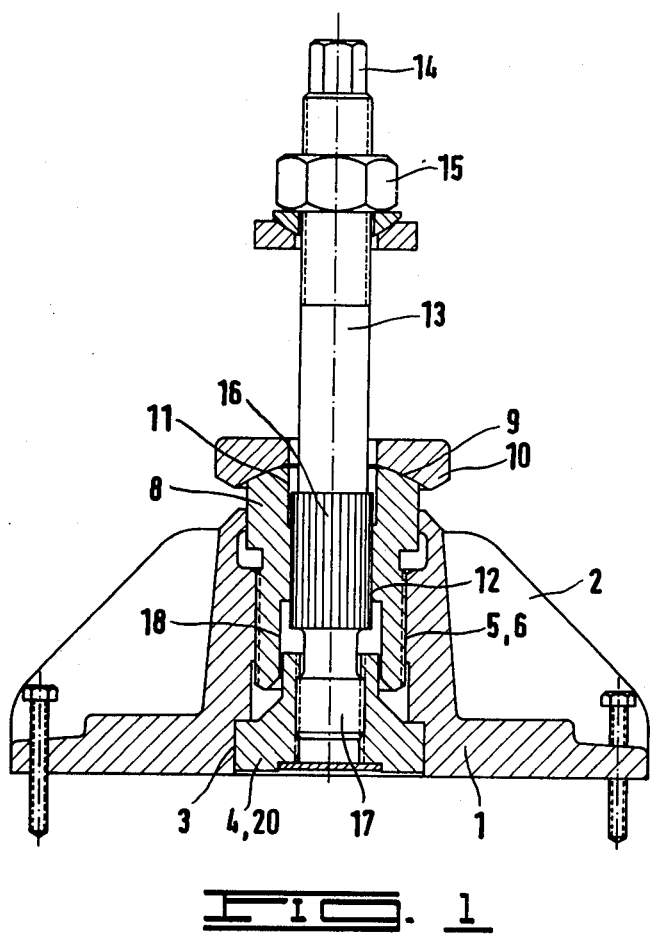
FIG. 1 is a vertical cross-sectional view of a first embodiment aligning device of the invention with off-center anchoring.
Figure 2:
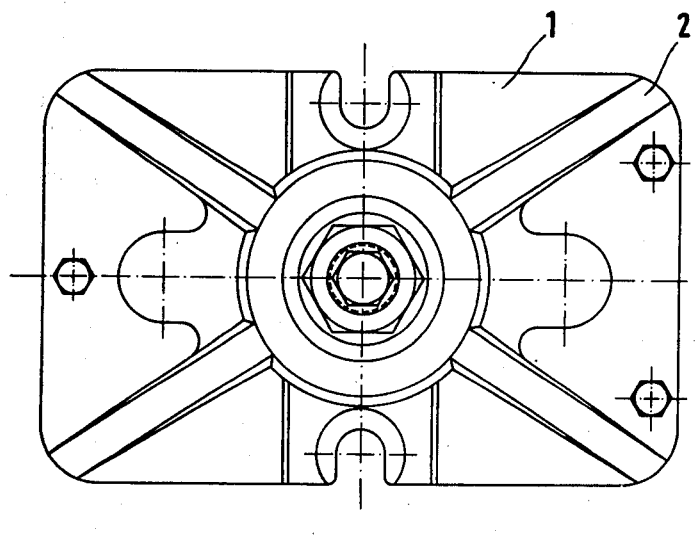
FIG. 2 is a top plan view of the aligning device of FIG. 1.

In FIG 1 numeral 1 designates the base body of the aligning device which has reinforcing ribs 2 and a recess 3 in its bottom, a centering plate 4 with a threaded sleeve 20 being placed in said recess. The base body 1, in addition, has a central bore 5 with a threaded portion 6 and an upper guide 7. A support body 8, having a corresponding external thread, is guided on the threaded portion 6 for vertical adjustment. At its upper end the support body 8 has a convex seat surface 9. In the drawing a correspondingly shaped thrust ring 10 engages this seat surface 9, the machine pedestal (not shown) in turn engaging the thrust ring. The support body has an inner bore 11 and a splined profile 12 in the middle. A tension rod 13 extends through inner bore 11 of the support body 8. This tension rod carries a hexagonal head 14 at its upper end, provided for adjustment purposes, and a locking nut 15 therebelow. This locking nut 15 may engage the machine pedestal (not shown) on the side remote from the thrust ring 10 through appropriate thrust bearings. By adjustment of the nut 15 on a corresponding threaded portion of the tension rod, the machine pedestal (not shown) is tightened against the thrust ring 10. In its central portion, the tension rod 13 is provided with a splined profile 16, which is mating with the splined profile 12 of the support body 8. The lower, again tapering end of the tension rod 13 extends through the inner bore 11 of the support body and is provided with a threaded portion 17, which is inserted into the threaded sleeve 20. The splined profile 16 has a greater axial length than the splined profile 12. This length of the splined profile 16 may also be selected in a different way, if the threaded portions 6 and 17 have threads with different pitches.

In this embodiment the threaded sleeve 20 is integral with the centering plate 4, the centering plate 4 is mounted nonrotatably in the recess 3 in the bottom of the base body 1. In this manner the coaxial alignment between tension rod 13 and threaded sleeve 20 is insured, but, at the same time, it is made sure that each rotation of the tension rod results in rotation of the support body 8 and in a vertical adjustment of the machine pedestal (not shown). As the threaded portion 17 and the threaded sleeve 20, on one hand, and the support body 8 and the base body 1, on the other hand, have threads of equal pitch and identical hand, the tension rod and the support body are displaced in axial direction by equal amounts relative the base body 1, when the tension rod is rotated, i.e., their relative position is not changed thereby.

FIG. 1 illustrates the aligning device in a neutral central position. The splined profile 16 on the tension rod, which profile has a greater axial length than the corresponding splined profile 12 on the support body 8, is in its central position, whereby a large adjustment displacement of the support body 8 towards both directions is available, but also easy adaptation to particular local conditions can be made. At its lower end the support body 8 is provided with a counterbore 18, the inner diameter of which is somewhat larger than the outer diameter of the threaded sleeve 20, whereby the adjustment of the support body 8 is not impaired by the threaded sleeve 20.

By guiding the tension rod 13 in a thread having the same pitch as that in which the support body 8 is guided, an alignment device of this type is so designed that the once set length of the tension rod 13 projecting over the support body 8 will no longer be changed. Due to the design of the splined profile 16 and due to the counterbore 18 at the lower end of the support body 8 it is insured that the aligning device can be adapted to the respective local conditions to a very large extent.

Figure 3:
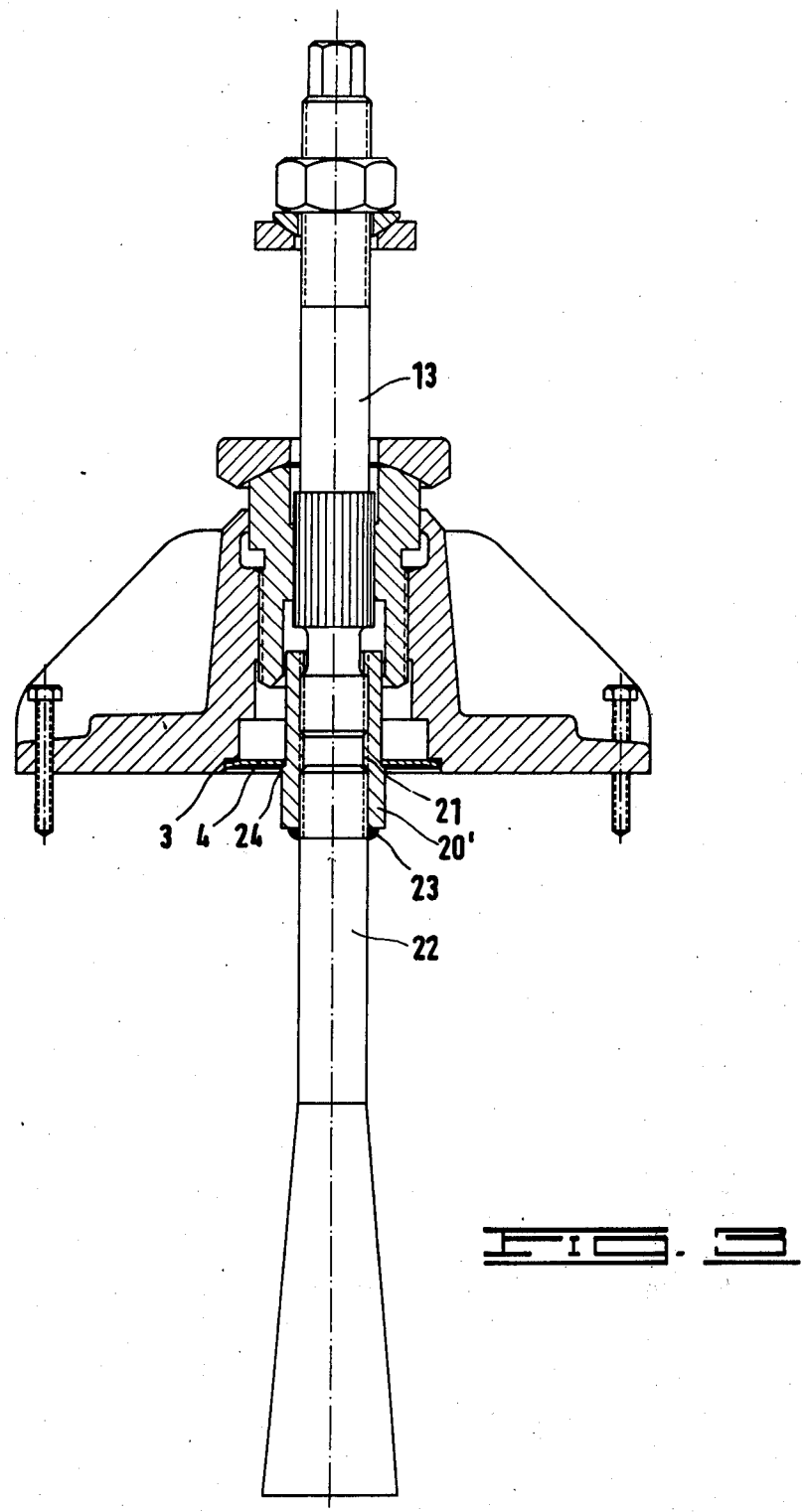
FIG. 3 is a second embodiment of the aligning device of FIG. 1 with central anchoring.

FIG. 3 illustrates a second modification of such an aligning device in which FIG. identical reference numerals have been assigned to all those parts identical with corresponding parts in the aligning device according to FIG. 1.

In the modification of the aligning device as shown in FIG. 3 a threaded sleeve 20', extending through a central bore of centering plate 4 towards the exterior, is provided. In this case said threaded sleeve 20' is formed as a socket having an internal thread at both its ends. The reduced diameter upper end of sleeve 20' is separated from the portion projecting externally by an abutment in the form of a peripheral shoulder 24 which engages centering plate 4 at the outer face thereof, the diameter of the central bore in centering plate 4 corresponding to the outer diameter of said tapered upper end. The end of sleeve 20' projecting to the exterior has a thread 21 and is screwed onto an anchoring screw 22 thereby, both being undetachably interconnected by welding as at 23. Instead of a sleeve 20' undetachably connected to anchoring screw 22, a further modification may be chosen in which the anchoring screw 22 and the sleeve 20' are formed integrally providing an upper extension on the central anchoring having an upper end of reduced outer diameter which is provided with an internal thread 21 for guiding or threadedly engaging the threaded portion of the tension rod 13.

Due to the reduced diameter of the upper end of sleeve 20', the aligning device of FIG. 3 has all characteristics of the aligning device of FIG. 1. In addition, however, the base body 1 is provided with a central anchoring in the form of the central anchoring screw 22, which is aligned coaxially with the tension rod 13. In such an arrangement, distortion of the base body 1 can no longer occur, as would be possible with off-center anchoring of the base body. Therefore, with the aligning device of FIG. 3, the desired flush engagement of the machine pedestal (not shown) with the support body and also of the aligning device with the foundation is insured. Though this is achieved by directly connecting the tension rod to the anchoring, the rotatability of the tension rod and thereby the adjustability of the support body is not affected adversely.

Changes may be made in the combination and arrangement of parts or elements as heretofore set forth in the specification and shown in the drawings without departing from the spirit and scope of the invention as defined in the following claims.

What is claimed is:

1. In an aligning device for machines of the type in which a threaded portion of a support body for supporting a machine pedestal is threadedly guided in a threaded portion of a base body anchored to or in the ground and is penetrated centrally through an internal bore therein by a tension rod, and the support body being arranged to be vertically adjusted also with the machine placed thereon, the improvement comprising:
   entrainment means for interengaging said tension rod and said support body;
   a threaded portion on said tension rod below said entrainment means;
   a threaded sleeve mounted in said base body and arranged coaxial with respect to said tension rod, said threaded portion on said tension rod being threadedly guided in said threaded sleeve; and
   the thread of said threaded portion of said tension rod having the same pitch as the thread of the threaded portion of said support body.

2. The aligning device as defined in claim 1 wherein:
   said threaded portion of said tension rod has external threads and said threaded sleeve has internal threads.

3. The aligning device as defined in claim 2 characterized further to include:
   a recess formed in the bottom of said base body;
   a centering plate disposed in said recess; and
   said threaded sleeve is mounted in said centering plate.

4. The aligning device as defined in claim 1 characterized further to include:
   a recess formed in the bottom of said base body;
   a centering plate disposed in said recess; and
   said threaded sleeve is mounted in said centering plate.

5. The aligning device as defined in claim 1 characterized further to include:
   a bottom on said support body;
   an upper end on said threaded sleeve; and ;p1 a counterbore in said bottom of said support body extending beyond said upper end of said threaded sleeve.

6. The aligning device as defined in claim 1 wherein said entrainment means is characterized further to include:
   a pair of interengaging splined profiles formed respectively on said tension rod and the internal bore of said support body.

7. An aligning device for supporting a machine pedestal on the ground, comprising: ;p1 base body means, having a threaded portion thereon, for anchoring said aligning device to the ground;
   support body means, having a threaded portion threadedly guided in the threaded portion of said base body and having a central internal bore therein, for supporting a machine pedestal and vertically adjusting the position of the machine supported thereon;
   a tension rod penetrating the internal bore of said support body means;
   entrainment means for interengaging said tension rod and said support body means;
   a threaded portion on said tension rod below said entrainment means;
   a threaded sleeve mounted in said base body means and arranged coaxially with respect to said tension rod, said threaded portion on said tension rod being threadedly guided in said threaded sleeve; and
   the thread of said threaded portion of said tension rod having the same pitch as the thread of the threaded portion of said support body means.

8. The aligning device as defined in claim 7 wherein:
   said threaded portion of said tension rod has external threads; and
   said threaded sleeve has internal threads.

9. The aligning device as defined in claim 8 characterized further to include:
   a recess formed in the bottom of said base body means;
   a centering plate disposed in said recess; and
   said threaded sleeve is mounted in said centering plate.

10. The aligning device as defined in claim 9 characterized further to include:
    a bottom on said support body means;
    an upper end on said threaded sleeve; and ;p1 a counterbore in said bottom of said support body means extending beyond said upper end of said threaded sleeve.

11. The aligning device as defined in claim 10 wherein said entrainment means is characterized further to include:
    a pair of interengaging splined profiles formed respectively on said tension rod and the internal bore of said support body means.

12. In an aligning device for supporting a machine pedestal in alignment with an anchoring screw anchored in or to the ground of the type in which a threaded portion of a support body for supporting a machine pedestal is threadedly guided in a threaded portion of a base body anchored to or in the ground and is penetrated centrally through an internal bore therein by a tension rod, and the support body being arranged to be vertically adjusted also with the machine placed thereon, the improvement comprising:
    entrainment means for interengaging said tension rod and said support body;
    a threaded portion on said tension rod below said entrainment means;
    a threaded sleeve mounted in said base body and arranged coaxial with respect to said tension rod, said threaded portion on said tension rod being threadedly guided in said threaded sleeve; and
    the thread of said threaded portion of said tension rod having the same pitch as the thread of the threaded portion of said support body.

13. The aligning device as defined in claim 12 characterized further to include:
    a recess formed in the bottom of said base body;
    a centering plate disposed in said recess; and
    said threaded sleeve is mounted in said centering plate.

14. The aligning device as defined in claim 13 wherein said threaded sleeve is characterized further as being secured to the anchoring screw and extending through said centering plate.

15. The aligning device as defined in claim 14 wherein said threaded sleeve is screwed on the upper end of the anchoring screw and is undetachably connected therewith by welding.

16. The aligning device as defined in claim 14 wherein said threaded sleeve is integral with the anchoring screw.

17. The aligning device as defined in claim 14 characterized further to include:
    a central bore in said centering plate;

an abutment formed on said threaded sleeve; and
said threaded sleeve extends through the central bore in said centering plate with the abutment in engagement with said centering plate.

18. The aligning device as defined in claim 17 wherein the abutment on said threaded sleeve is a peripheral shoulder, and said threaded sleeve has a reduced diameter upper end.

19. The aligning device as defined in claim 18 wherein said threaded sleeve has a length at least equal to the sum of the adjustment displacement of said support body relative to said base body and the thread length of the threaded portion of said tension rod.

20. The aligning device as defined in claim 12 characterized further to include:
a bottom on said support body;
an upper end on said threaded sleeve; and
a counterbore in said bottom of said support body extending beyond the upper end of said threaded sleeve.

21. The aligning device as defined in claim 12 wherein said entrainment means is characterized further to include:
a pair of interengaging splined profiles formed respectively on said tension rod and the internal bore of said support body.

22. The aligning device as defined in claim 12 wherein the threaded portion of said tension rod has external threads and said threaded sleeve has internal threads.

23. The aligning device as defined in claim 12 characterized further to include:
a recess formed in the bottom of said base body;
a centering plate disposed in said recess; and
said threaded sleeve extends through said centering plate.

* * * * *

UNITED STATES PATENT OFFICE
CERTIFICATE OF CORRECTION

Patent No. 4,061,298                    Dated December 6, 1977

Inventor(s) Hubert Reinhard Kober

It is certified that error appears in the above-identified patent and that said Letters Patent are hereby corrected as shown below:

Column 5

Claim 5, line 40, delete ";pl"

Column 5

Claim 7, line 50, delete ";pl"

Column 6

Claim 10, line 18, delete ";pl"

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*